July 3, 1951 M. MIALHE 2,559,025
MULTIPLE LATHE
Filed July 18, 1946
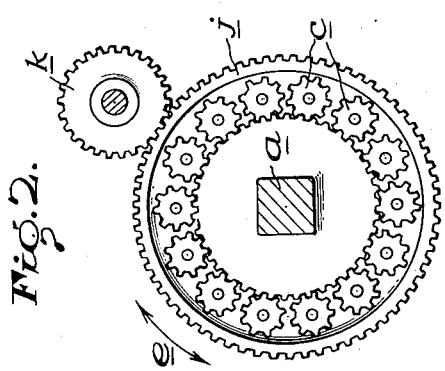
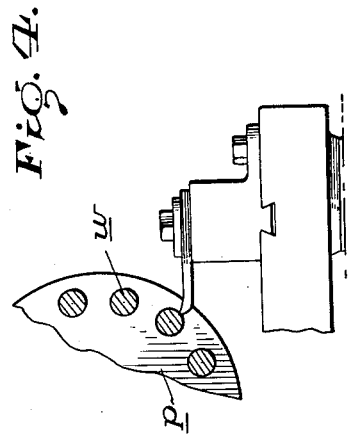
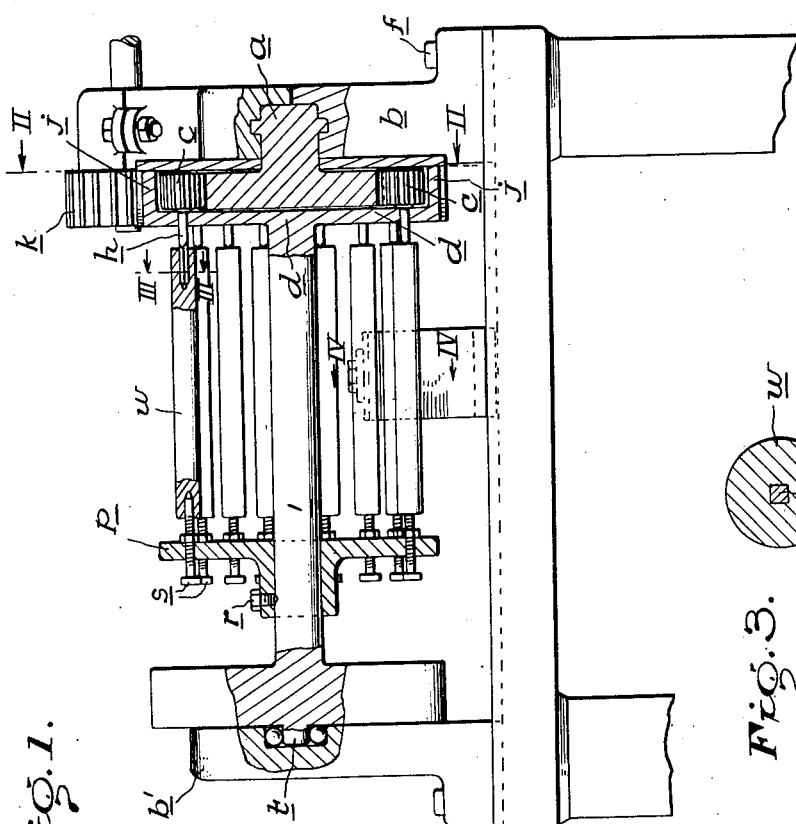
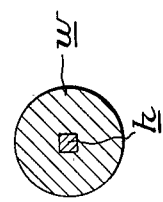
INVENTOR
Marcel Mialhe.
BY
ATTORNEY Patented July 3, 1951

2,559,025

UNITED STATES PATENT OFFICE 2,559,025

MULTIPLE LATHE

Marcel Mialhe, Vabre, France

Application July 18, 1946, Serial No. 684,460
In France August 22, 1942

Section 1, Public Law 690, August 8, 1946
Patent expires August 22, 1962

1 Claim. (Cl. 82—3)

This present invention relates to a multiple lathe or lathe in which each of a plurality of work pieces rotates around its individual axis, and the latter also revolves around a common axis, while one or several tools operate on the work pieces in succession.

It is an object of the invention to provide a mechanism of the type described in which the number of rotations of the pinions, spindles and work pieces is not an integral multiple of the simultaneous rotations of the head stock carrying the work pieces around a common axis.

The description should be read in connection with the accompanying drawing forming part of the application, which illustrates, in a purely diagrammatic manner and by way of example only, an embodiment of my invention, and wherein:

Fig. 1 is a side elevation of the preferred embodiment of applicant's invention, partly in section;

Fig. 2 is a transverse section on line 2—2 of Fig. 1;

Figure 3 is an enlarged detail sectional view taken on line III—III of Figure 1;

Figure 4 is a detail sectional view taken on the line IV—IV of Figure 1.

In the drawing, $a$ denotes a gear carrying on its right hand side a journal fixed and held against rotation in the right hand frame $b$. The same is provided at its lower end with a foot extending to the right and apertured for a fastener $f$ for fastening the frame to a work bench.

In mesh with gear $a$ are a plurality of pinions $c$ preferably equi-distantly spaced from one another and each carrying on its left hand side a spindle $h$. The free end of each spindle is formed to function as a lathe center engaging and thereby rotating a work piece $w$. Each spindle is journaled in a head stock forming a flat plate $d$ engaging the left hand free side of gear $a$ and also including a cylindrical portion $j$ with external gear teeth but smooth on its inner sides. The cylindrical head stock part surrounds the pinions and is driven by gear $k$.

To the left hand outer side of the flat part of the head stock is fixed one end of a shaft $l$ around which the work pieces are grouped and which rigidly carries adjacent its other end a tail stock $p$ by means of a fastener $r$ inserted in a slot formed in a hub of the tail stock. The disc has a plurality of openings each in alignment with one of the journal openings in the plate part of the head stock. In the openings of tail stock $p$ are mounted against axial movement spindles $s$ each engaging with their ends which project beyond the right hand face of the tail stock, the other end of a work piece, and holding the same in parallelism to the other work pieces and shaft $l$. This shaft is rotatably mounted in a bearing $t$ fixed to a frame member $b'$ which is a substantial duplicate of the frame $b$ previously described. Rotation of the headstock $d$ causes the shaft $l$ rigidly fixed to it to rotate also, while the pinions $c$ are set revolving as planet wheels around the gear $a$ which forms a sun wheel, carrying along the spindles $h$, while the spindles $s$ are carried along by the tail stock $p$ fixed to the shaft $l$.

According to this embodiment of my invention, now, the number of teeth on the fixed gear $a$ differs from a predetermined integral multiple of the teeth on each pinion $c$, being either greater or smaller than such integral multiple.

Owing to the characteristic non-integral ratio between the teeth of the fixed gear and the teeth of a pinion, each work piece turned thereby after a complete revolution around the common axis presents a peripheral portion for engagement by the tool (not shown) different from the peripheral portion presented to the tool at the beginning of such revolution.

In a lathe such as shown in the drawing, by way of example, a given point on a pinion describes an epicycloid upon the periphery of the fixed gear $a$ and may therefore be called the epicycloidal form.

The illustration and description of the epicycloidal form of execution is not to be construed as a limitation of applicant's invention, for obviously the function of the gears $a$ and $j$ may be reversed so that gear $a$ is driven while gear $j$ is fixed. The pinions then describe hypocycloids upon the interior peripheral surface of gear $j$, which surface is then provided with teeth while the gear $a$ carries a plate journaling the pinion spindles.

I wish it to be understood that what I have shown on the drawing and have described in the specification, is only one out of various combinations of means for causing, according to my invention, the planet wheels and their spindles carrying the workpieces to rotate about their individual axes at a number of rotations which is not an integral multiple of their number of planetary revolutions about their common axis.

I claim:

In a multiple lathe in combination, a shaft, means to support said shaft at its ends, a head stock and a tail stock aligned and secured to said shaft to rotate therewith, a sun gear in said head stock mounted on the shaft, work-rotating spindles mounted at one end in a circle concentric with the axis of said shaft in said head stock, planet gears mounted on said spindles and meshing with said sun gear, means on said tailstock to support the other end of said spindles, and means for rotating said shaft, the numbers of teeth on said sun gear differing from an integral multiple of the number of teeth on each planet gear.

MARCEL MIALHE.

REFERENCES CITED

The following references are of record in the file of this patent:

UNITED STATES PATENTS

| Number | Name | Date |
|---|---|---|
| 1,512,381 | Trucott | Oct. 21, 1924 |
| 1,574,726 | Bullard | Feb. 23, 1926 |
| 1,955,220 | Biewend | Apr. 17, 1934 |
| 1,996,368 | Drissner | Apr. 2, 1935 |
| 2,035,043 | Bullard | Mar. 24, 1936 |
| 2,280,229 | Groene | Apr. 21, 1942 |